United States Patent
Catanzaro

(10) Patent No.: US 9,654,677 B2
(45) Date of Patent: May 16, 2017

(54) CAMERA-PHONE CASE WITH RANGE FINDER

(71) Applicant: Vincent J. Catanzaro, Philadelphia, PA (US)

(72) Inventor: Vincent J. Catanzaro, Philadelphia, PA (US)

(73) Assignee: Vincent J. Catanzaro, Philadelphia, PA (US)

( * ) Notice: Subject to any disclaimer, the term of this patent is extended or adjusted under 35 U.S.C. 154(b) by 49 days.

(21) Appl. No.: 14/839,729

(22) Filed: Aug. 28, 2015

(65) Prior Publication Data

US 2016/0065816 A1 Mar. 3, 2016

Related U.S. Application Data

(60) Provisional application No. 62/043,798, filed on Aug. 29, 2014.

(51) Int. Cl.
*H04N 5/225* (2006.01)
*H04N 5/232* (2006.01)

(52) U.S. Cl.
CPC ......... *H04N 5/2254* (2013.01); *H04N 5/2252* (2013.01); *H04N 5/23293* (2013.01)

(58) Field of Classification Search
CPC .................................................. H04N 5/2254
USPC .......................................................... 348/375
See application file for complete search history.

(56) References Cited

U.S. PATENT DOCUMENTS

| | | | | |
|---|---|---|---|---|
| 4,032,940 A | * | 6/1977 | Chan | G03B 1/08 396/348 |
| 4,508,440 A | * | 4/1985 | Costa | G03B 17/04 396/350 |
| 4,719,487 A | * | 1/1988 | Johnson | G03B 7/09908 396/274 |
| 5,146,253 A | * | 9/1992 | Swayze | G03B 17/04 396/349 |
| 5,659,825 A | * | 8/1997 | Dobashi | G03B 19/12 396/357 |
| 5,701,535 A | * | 12/1997 | Reibl | G03B 17/04 396/348 |
| 5,765,066 A | * | 6/1998 | Balling | G03B 17/42 396/348 |
| 6,302,597 B1 | * | 10/2001 | Chang | G03B 13/02 396/373 |
| 6,882,864 B2 | * | 4/2005 | Miyake | H04N 7/142 348/14.01 |

(Continued)

*Primary Examiner* — Usman Khan
(74) *Attorney, Agent, or Firm* — White and Williams LLP

(57) ABSTRACT

A case for a photographic device with a primary visual interface comprising a screen is disclosed. The case comprises a body, an optical viewfinder assembly having a top portion and a bottom portion, the bottom portion being recessed into the body, and the top portion configured to slide between a closed position, where a top plane of the top portion is substantially flush with a top of the body, and an open position where the top portion is above the top of the body, thereby exposing an aperture in the viewfinder assembly; and a track and a track guide in mechanical communication, wherein one of the track and the track guide is attached to the optical viewfinder, to permit the top portion of the optical viewfinder assembly to slide between the closed position and the open position.

4 Claims, 3 Drawing Sheets

(56) References Cited

U.S. PATENT DOCUMENTS

| | | | |
|---|---|---|---|
| 6,925,254 B2* | 8/2005 | Kato | H04N 5/2256 348/333.06 |
| 2003/0223741 A1* | 12/2003 | Yagi | G03B 15/05 396/178 |

* cited by examiner

CAMERA-PHONE CASE WITH RANGE FINDER

PRIORITY

This application claims the benefit of U.S. Provisional Application No. 62/043,798, filed Aug. 29, 2014, the disclosure of which is incorporated herein by reference in its entirety.

BACKGROUND OF THE INVENTION

Since the introduction of smartphones, the quality of picture taken by smartphone cameras has increased dramatically. The increase in image quality has caused more and more users of mobile devices to stop using a dedicated point and shoot digital camera, and instead use the camera built into the smartphone or other mobile device that they are already carrying.

However, because smartphones are multi-purpose devices, they do not have features specific to picture-taking, such as viewfinders. Picture taking on the modern smartphone is done with reference to a screen built into the phone, which is usually LCD, LED, or similar flat screen technology. These types of screens can suffer degraded performance in bright light situations, especially natural sunlight, making smartphone picture taking outdoors problematic. Some such screens also cannot be seen by certain types of sunglasses with polarized lenses when held in a certain orientation, which makes picture taking in bright sunlight more difficult.

Accordingly, it would be a useful addition to a smartphone to have a viewfinder that could, at minimal cost, provide an alternative to the screen for photography framing when the screen is not viewable. It would also be useful to have an ability to shield the screen from the natural light that is impeding its being seen, or impede its contrast, without also shielding the lens during the act of taking the photograph.

SUMMARY OF THE INVENTION

In one aspect of the disclosure, a case for a photographic device with a primary visual interface comprising a screen is disclosed. The case comprises a body, an optical viewfinder assembly having a top portion and a bottom portion, the bottom portion being recessed into the body, and the top portion configured to slide between a closed position, where a top plane of the top portion is substantially flush with a top of the body, and an open position where the top portion is above the top of the body, thereby exposing an aperture in the viewfinder assembly; and a track and a track guide in mechanical communication, wherein one of the track and the track guide is attached to the optical viewfinder, to permit the top portion of the optical viewfinder assembly to slide between the closed position and the open position. In one aspect of the disclosure, the aperture further comprises a lens. In one aspect of the disclosure, the aperture further comprises a reticle. In one aspect of the disclosure, the aperture further comprises a range finder.

DETAILED DESCRIPTION

Figure 1A:
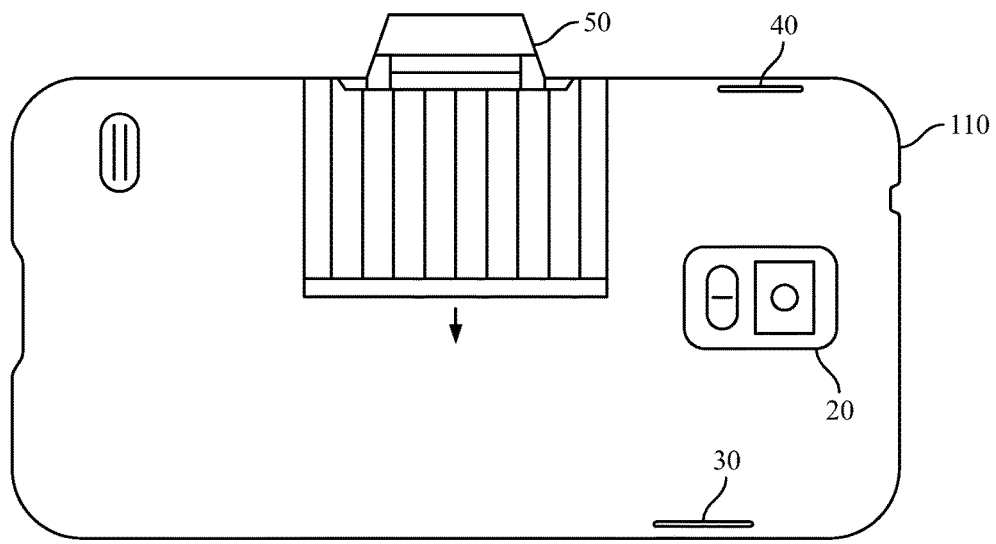
FIGS. 1A and 1B are front views of a cellular phone case in accordance with one aspect of the present disclosure.
Figure 1B:
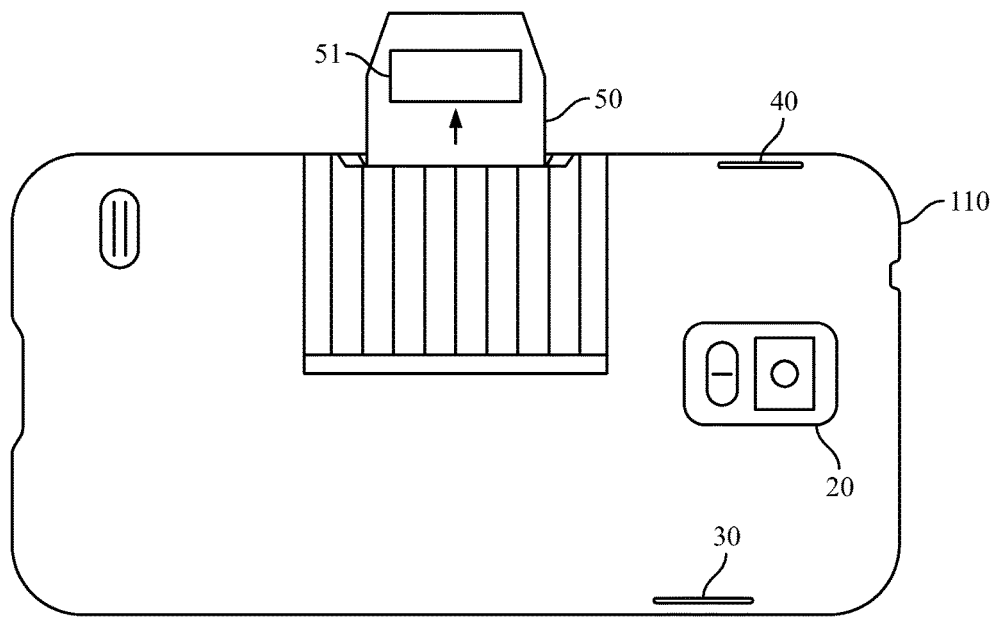

FIGS. 1A and 1B are a top view of how an optical slide operates in a cellular phone case in accordance with one aspect of the present disclosure. A cellular phone case includes a body of the case 10. The body 10 includes a lens hole 20 which accommodates the lens (not shown) of the camera which is included in the cellular phone that sits in the case. Persons having ordinary skill in the art will realize that the lens hole 20 will be strategically placed to accommodate the lens placement of a particular cell phone model for which the case is manufactured. The body 10 also includes a volume hole 30 to accommodate volume up and down buttons for the particular cell phone model for which the case is manufactured. Persons having skill in the art will realize that volume up and down buttons are present in different physical locations on different cell phones and different versions of the case can be manufactured to accommodate the different button locations. Persons having skill in the art would also realize that, in some models of cellular phone, the volume up or down button doubles as a shutter button when taking pictures. The case also includes an on/off hole 40 to accommodate the cellular phone's on/off button (not shown). Persons having skill in the art will realize that other openings can be present for other buttons or other features of the cellular phone, such as a "home" button, a charging or synchronization jack, or a headphone jack. The body 10 includes a viewfinder assembly 50. The viewfinder assembly 50 includes an aperture 51. Persons having skill in the art will realize that an optical lens can be added. In accordance with one aspect of the disclosure, the viewfinder assembly 50 has two positions, a raised position as shown in FIG. 1B, and a lowered position with most of the optical viewfinder is obscured from view, as shown in FIG. 1A.

Figure 1C:
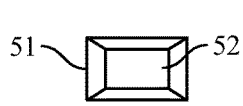
FIGS. 1C-1E are exploded views of components in accordance with aspects of the present disclosure.
Figure 1C:
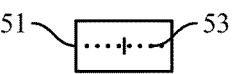
Figure 1D:
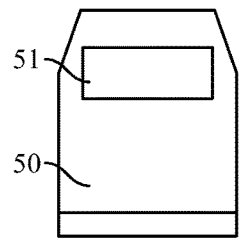
Figure 1E:
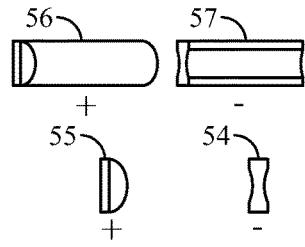

FIG. 1C is an exploded view of the aperture 51, which in one aspect can contain a reticule 52. In one aspect of the disclosure, a ranger finder 53 may be used instead of the reticule 52. In one aspect of the disclosure, as shown in FIG. 1E, concave lenses 54 and convex lenses 55 may be used in the aperture 51, separately or in combination. In another aspect, the viewfinder may not include lenses at all, and in such an aspect can be used as a site to frame pictures and target picture areas but without the use of lenses. In one aspect of the invention, e.g. for phones that do not have a physical button for taking photographs, a marking can be placed on the screen, e.g. by the user, to denote where the shutter button is on the screen because the on-screen user interface cannot be seen. FIG. 1D shows the aperture 51 as it is integrated into the viewfinder assembly 50 that traverses the raised and lowered positions.

Viewfinder assembly 50 is attached to the body 10 of a smartphone case to permit picture taking when the images on LCD and LED screens are difficult to see, e.g., outdoors in bright sunlight. In one aspect of the invention, the viewfinder 50 contains one or more lenses. As shown in FIG. 1E, a first lens can be a positive diopter eyepiece 56. A second lens can be a negative diopter objective lens 57.

Persons having skill in the art will realize that diopters can vary according to the wide angle of the screen. The lenses are integrated to adapt to the wide angle of the smartphone so that the image in the viewfinder has the same aspect ratio, proportions and boundaries as the (unviewable) image on the screen.

Figure 2A:
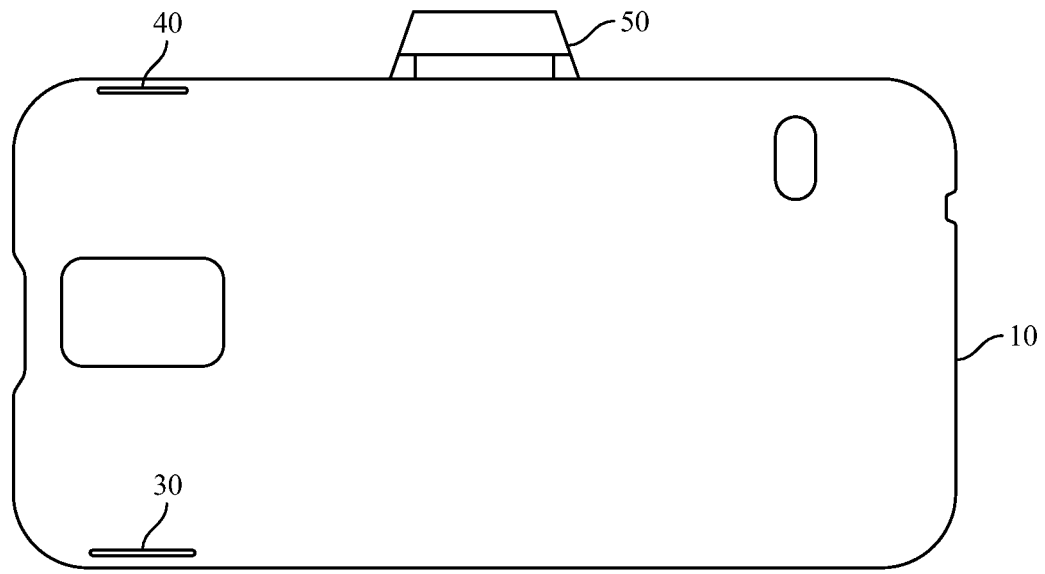
FIGS. 2A and 2B are rear views of one aspect of the present disclosure.
Figure 2B:
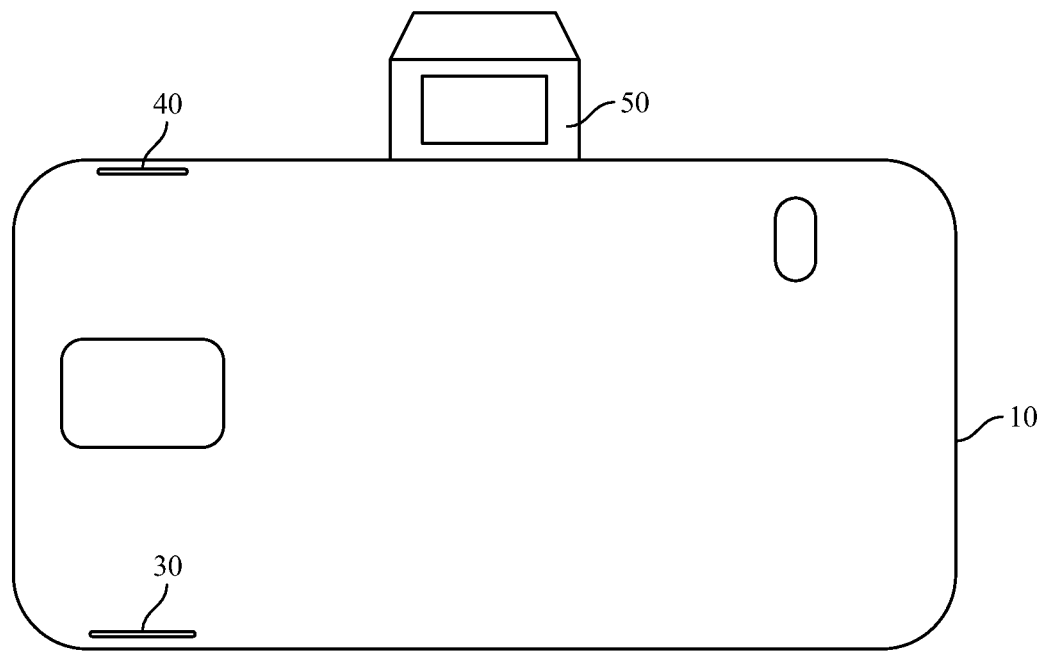

FIGS. 2A and 2B show a rear view of the case with the viewfinder assembly 50 in raised and lowered positions. As shown in the front views of FIGS. 1A and 1B, the viewfinder assembly 50 is partially exposed in the lowered position of FIG. 2A, and fully exposed and useable in the raised position of FIG. 2B.

Figure 3A:
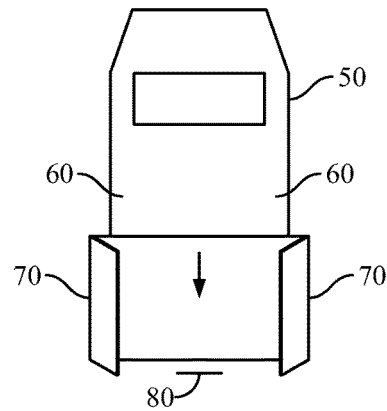
FIG. 3A is an exploded view of a viewfinder assembly in accordance with one aspect of the invention.
Figure 3B:
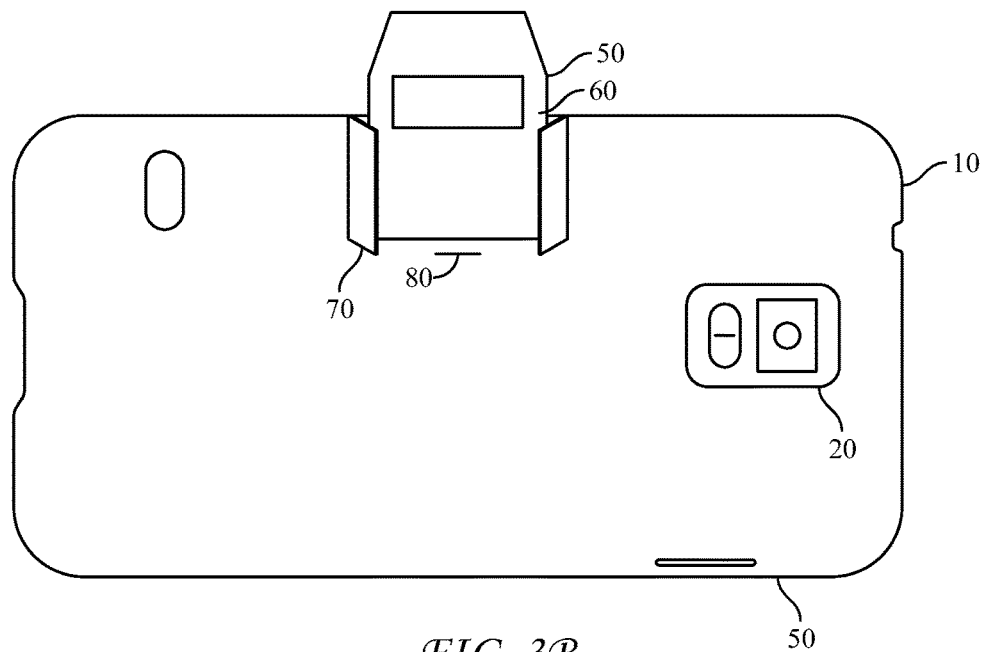
FIG. 3B is a cross-sectional view of an optical viewfinder assembly, tracks, and track guides, inside a case, in accordance with one aspect of the present disclosure.

Turning now to FIGS. 3A and 3B, the viewfinder 50 includes a track 60. The track 60 slides along track guides 70, which allow the optical viewfinder to slide up and down. In accordance with one aspect, the case with the viewfinder 50 in the closed position is substantially the same shape as the cellular phone. In accordance with one aspect, a track stopper 80 is positioned so that it will be below the bottom of the viewfinder 50 when the viewfinder 50 is in the closed position, in order to prevent the viewfinder from sliding lower than the intended closed position. In one aspect, the track 60, the track guides 70 and the track stopper 80 are internal to the case, and not visible. The viewfinder assembly 50 can be recessed into the case and popped out when needed, e.g. by actuating a button or by pressing on the viewfinder itself, so that it only protrudes from the case when it is in use. In one aspect, the viewfinder assembly may be spring loaded. In another aspect, it may be manually actuated by pulling and pushing on the viewfinder assembly 50.

Figure 4:
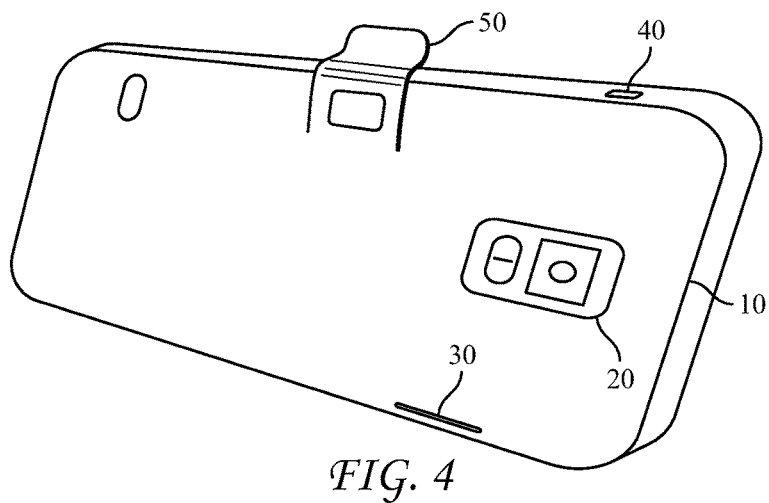
FIG. 4 is a side view of a cellular phone case in accordance with one aspect of the present disclosure.

FIG. 4 shows a diagonal view of the case of the present disclosure in a lowered position.

Persons having skill in the art will realize that the embodiments disclosed herein are exemplary, and that deviations from same without altering the primary features of the invention may also permit the invention, and/or one or more aspects of same, to perform its intended function of either augmenting the view with a viewfinder, or shielding the screen from sunlight to allow view through the screen itself. Persons having skill in the art will further realize that such cases can be adapted to picture taking devices that are not smartphones or mobile devices, such as some modern point and shoot digital cameras that are sold without built in viewfinders. Persons having skill in the art will further realize that such cases can be adapted to activities using a mobile device other than picture and video taking, such as reading or viewing of video content.

The invention claimed is:

1. A removable case for a smartphone-style photographic device having a camera and flash, wherein said photographic device has a primary visual interface comprising a screen, said case comprising:
   a) a body removable from the smartphone-style photographic device and substantially covering a surface of the smartphone-style photographic device opposite the screen, the body having one or more apertures with locations corresponding to one or more of the camera and the flash, and the body covering at least a portion of at least two opposite surfaces of the smartphone-style photographic device other than the screen;
   b) an optical viewfinder having a top portion and a bottom portion, the bottom portion being recessed into a cavity within the body when the optical viewfinder is in the open or closed position, the optical viewfinder configured to slide between a closed position, where a top plane of the top portion of the optical viewfinder is substantially flush with a top of the body and the remainder of the top portion of the optical viewfinder is recessed into the cavity within the body, and an open position where the top portion of the optical viewfinder is above the top of the body, thereby exposing an aperture in the optical viewfinder sized and shaped to frame an estimated photographic scene approximately the same as a photographic scene capturable by the camera; and
   c) a track and a track guide in mechanical communication, wherein one of the track and the track guide is attached to the optical viewfinder and the other of the track and the track guide is attached to the body, wherein the track and the track guide permit the optical viewfinder to slide between the closed position and the open position.

2. The case of claim 1, wherein the aperture further comprises a lens.

3. The case of claim 1, wherein the aperture further comprises a reticle.

4. The case of claim 1, wherein the aperture further comprises a range finder.

* * * * *